July 15, 1952 — G. P. B. ATLUNG — 2,603,303

MANEUVERING DEVICE FOR CRANES AND THE LIKE MECHANISMS

Filed Jan. 23, 1948

INVENTOR:

Patented July 15, 1952

2,603,303

UNITED STATES PATENT OFFICE 2,603,303

MANEUVERING DEVICE FOR CRANES AND THE LIKE MECHANISMS

Gunnar Preben Bjorn Atlung, Lyngby, Denmark
Application January 23, 1948, Serial No. 4,015
In Denmark December 23, 1946

1 Claim. (Cl. 180—77)

The present invention relates to a maneuvering device for cranes, transporting trucks or vessels, excavators and similar machines provided with a driver's cabin, or a platform, from which the driver directs the machinery.

In such machines, vehicles or vessels it is often difficult for the driver to obtain an unobstructed view of the direction of drive or operation, especially when driving or working rearwardly, thus incurring risk of accidents, or collision with other machines, vehicles or vessels.

This danger is eliminated in the maneuvering device according to the present invention, which is mainly characterized by the fact that the driver's seat, or the platform on which the driver stands, is movable around the steering means of the vehicle, vessel or machine, and is provided with means surrounding the steering wheel or guiding means and connected in such a manner to the maneuvering members such as brakes, clutches, gearing, or air and fuel regulating members, that upon actuating the aforesaid means the driver is able to maneuver the latter members.

By these arrangements the driver is able to move together with his seat, to any position in which he has the best possible view of the direction of movement or of operation, and he can from any such position operate the maneuvering devices of the vehicle, vessel or machine.

Figure 1:
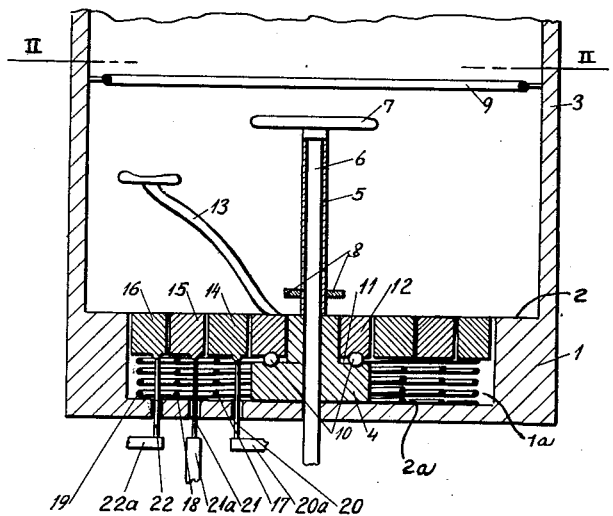
Figure 2:
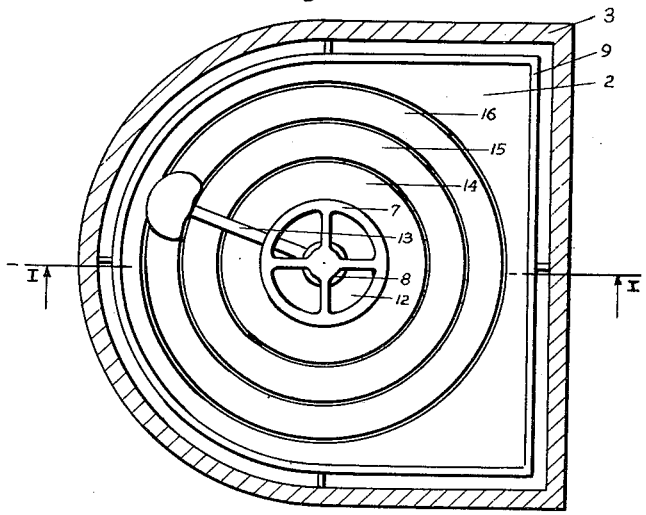

The invention is illustrated in the accompanying drawing, Fig. 1 being a vertical section on line I—I in Fig. 2, and Fig. 2 is a horizontal section on line II—II in Fig. 1.

The cabin 1 shown comprises a platform 2 and walls 3. To the floor 2a of a recess 1a in the platform is attached a centrally disposed bearing 4 which carries a tubular extension 5 projecting upwardly into the cabin. This extension encompasses a steering shaft 6 which upon its upper end carries a steering wheel 7 projecting outside the extension 5. A little above the upper surface of bearing 4 the extension 5 carries a footrest 8. A rail bar 9 is fixed in a suitable position within the cabin. The bearing 4 has an annular shoulder 11 provided in its upper surface with a ball race for the balls 10 of a ball bearing supporting the innermost ring 12 of a number of coaxially disposed rings 12, 14, 15 and 16. The innermost ring 12 carries a seat 13, and the rings 14, 15 and 16 are each supported by compression springs 17, 18 and 19 respectively, so that when inactive their upper surfaces are in the plane of the upper surface of the platform 2. Each ring 14, 15 and 16 bears upon a plunger 20, 21, and 22 respectively. The said plungers are arranged for operating members 20a, 21a and 22a respectively that actuate a throttle, a brake and a clutch respectively for the machine, vessel or vehicle to be operated.

An operator seated in the seat 13 can by pressing against either the foot rest 8, or by holding the rail 9, cause the ring 12 to revolve together with the seat to any desired position around the bearing 4. In any such position the operator may by depressing the rings 14, 15 or 16 operate the plungers 20, 21 and 22 respectively for maneuvering the machine, vessel or vehicle. These plungers can either be connected in such a manner to the respective rings that they return to their inoperative position when the rings are released or the plungers may be spring-actuated separately.

The maneuvering device may be constructed in other manners than described above, and illustrated in the accompanying drawing, without departing from the scope of the invention. Thus for instance the annular members may be arranged to move in any other suitable manner than shown, for instance they may be arranged to be operated by hand from any suitable position within the cabin. Instead of arranging the device within a cabin it may be arranged upon a platform or the like on which the operator stands.

I claim:

In a maneuvering device for motor vehicles, the combination of a recessed supporting platform, an annular bearing rigidly fixed approximately in the middle of the platform recess, a steering unit arranged centrally in relation to the said bearing, a ring member arranged for concentric rotation on the bearing, an operator's seat attached to the said ring for rotation therewith, non-rotatable annular operating members arranged in the platform recess concentrically to the ring member for vertical displacement in relation to the platform with their top surfaces in the plane of the upper surface of the platform when inactive, resilient members interposed between the said annular operating members and the floor of the platform recess, and plungers connecting each operating member to a separate drive control mechanism of the motor vehicle.

GUNNAR PREBEN BJORN ATLUNG.

REFERENCES CITED

The following references are of record in the file of this patent:

UNITED STATES PATENTS

| Number | Name | Date |
| --- | --- | --- |
| 1,189,378 | Mohr | July 4, 1916 |
| 1,641,802 | Danly | Sept. 6, 1927 |
| 2,384,890 | Coldwell | Sept. 18, 1945 |

FOREIGN PATENTS

| Number | Country | Date |
| --- | --- | --- |
| 68,857 | Denmark | Apr. 4, 1949 |
| 285,475 | Germany | July 2, 1915 |